US010212066B1

(12) United States Patent
Carlson

(10) Patent No.: US 10,212,066 B1
(45) Date of Patent: Feb. 19, 2019

(54) REPORTING OPERATIONAL METRICS IN SPEECH-BASED SYSTEMS

(71) Applicant: Amazon Technologies, Inc., Seattle, WA (US)

(72) Inventor: Ty Loren Carlson, Redmond, WA (US)

(73) Assignee: Amazon Technologies, Inc., Settle, WA (US)

( * ) Notice: Subject to any disclaimer, the term of this patent is extended or adjusted under 35 U.S.C. 154(b) by 0 days.

(21) Appl. No.: 15/395,393

(22) Filed: Dec. 30, 2016

Related U.S. Application Data

(63) Continuation of application No. 14/755,957, filed on Jun. 30, 2015, now Pat. No. 9,536,527.

(51) Int. Cl.
| | |
|---|---|
| *G06F 3/16* | (2006.01) |
| *H04L 12/26* | (2006.01) |
| *G10L 15/22* | (2006.01) |
| *G10L 13/00* | (2006.01) |
| *G10L 15/30* | (2013.01) |

(52) U.S. Cl.
CPC ........... *H04L 43/14* (2013.01); *G10L 13/00* (2013.01); *G10L 15/22* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,893,902 | A * | 4/1999 | Transue ................ | G06Q 20/04 704/270 |
| 6,988,070 | B2 * | 1/2006 | Kawasaki .............. | G10L 15/26 704/270 |
| 7,698,131 | B2 * | 4/2010 | Bennett ............... | G06F 17/2775 704/215 |
| 8,892,446 | B2 * | 11/2014 | Cheyer ............... | G06F 17/3087 704/275 |
| 9,196,250 | B2 * | 11/2015 | Fry ........................ | G10L 15/26 |
| 9,679,560 | B2 * | 6/2017 | Willett ................... | G10L 15/20 |
| 2002/0055844 | A1 * | 5/2002 | L'Esperance ......... | H04M 1/271 704/260 |

(Continued)

OTHER PUBLICATIONS

Office action for U.S. Appl. No. 14/755,957, dated Apr. 6, 2016, Carlson, "Reporting Operational Metrics in Speech-Based Systems", 16 pages.

*Primary Examiner* — Marcus T Riley
(74) *Attorney, Agent, or Firm* — Lee & Hayes, P.C.

(57) ABSTRACT

A speech-based system is configured to use its audio-based user interface to present various types of device status information such as wireless signal strengths, communication parameters, battery levels, and so forth. In described embodiments, the system is configured to understand spoken user requests for device and system status. For example, the user may speak a request to obtain the current wireless signal strength of the speech-based system. The speech-based system may respond by determining the signal strength and by playing speech or other sound informing the user of the signal strength. Furthermore, the system may monitor operational parameters to detect conditions that may degrade the user experience, and may report such conditions using generated speech or other sounds.

20 Claims, 4 Drawing Sheets

(56) References Cited

U.S. PATENT DOCUMENTS

| | | | |
|---|---|---|---|
| 2005/0035854 A1* | 2/2005 | Gupta | A61B 5/0062 340/531 |
| 2006/0152382 A1* | 7/2006 | Hiltunen | G08B 6/00 340/691.1 |
| 2007/0112571 A1* | 5/2007 | Thirugnana | H04M 1/274516 704/270 |
| 2010/0049525 A1* | 2/2010 | Paden | G10L 15/22 704/270.1 |
| 2010/0324910 A1* | 12/2010 | Chambers | G10L 15/30 704/270.1 |
| 2014/0003372 A1* | 1/2014 | Qian | H04W 8/22 370/329 |
| 2014/0039888 A1* | 2/2014 | Taubman | H04M 1/72572 704/235 |
| 2014/0343946 A1* | 11/2014 | Torok | G10L 15/30 704/270.1 |
| 2015/0040012 A1* | 2/2015 | Faaborg | G06F 3/167 715/728 |
| 2016/0012819 A1* | 1/2016 | Willett | G10L 15/20 704/233 |

\* cited by examiner

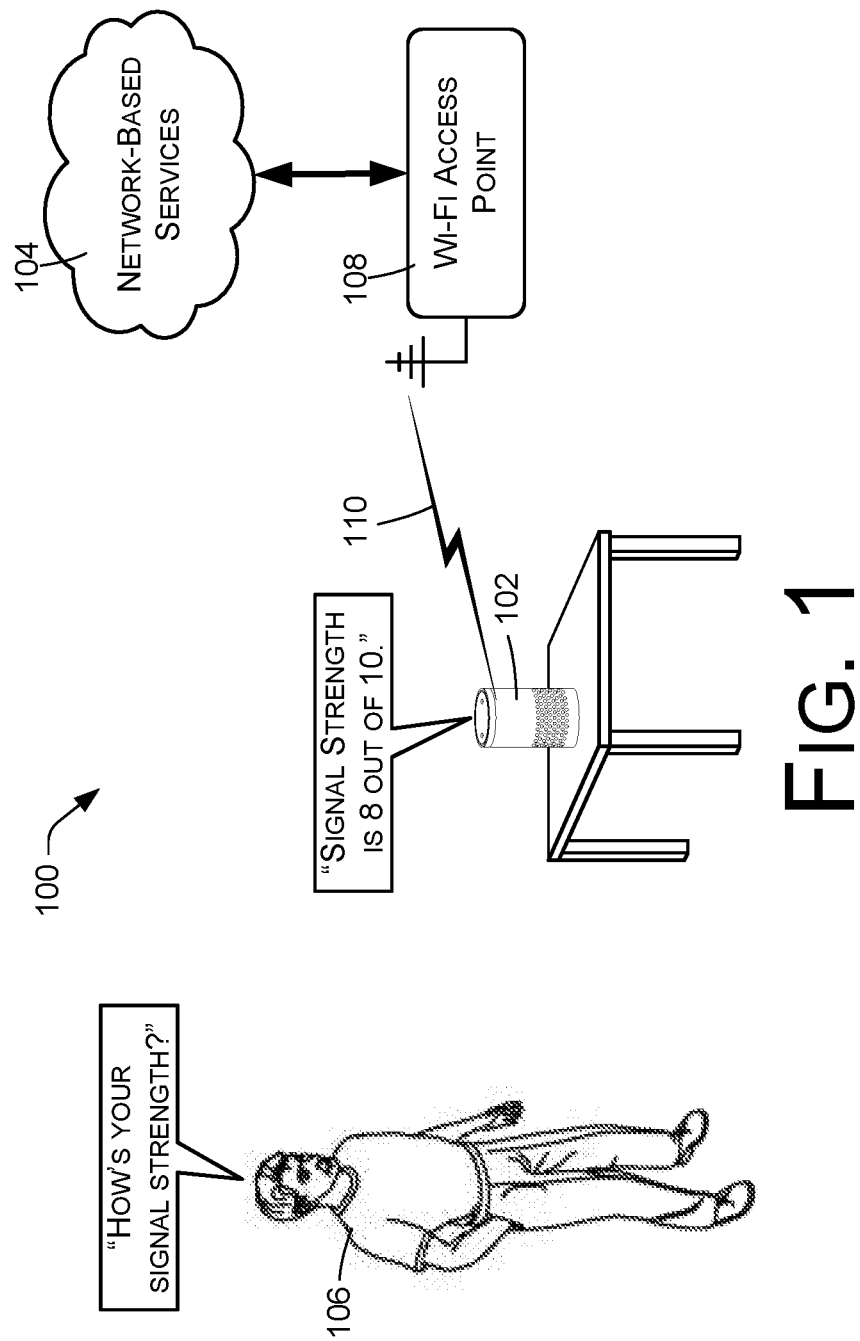

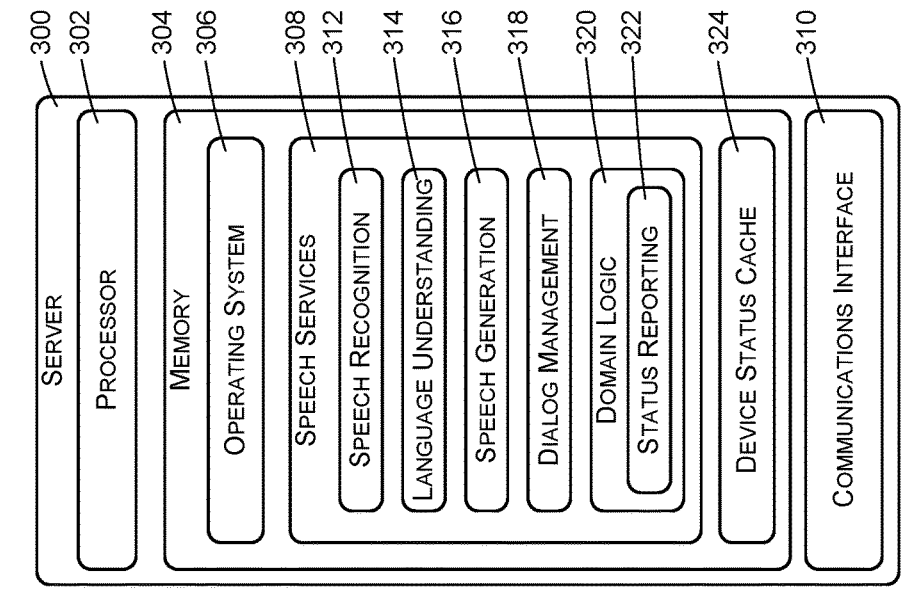
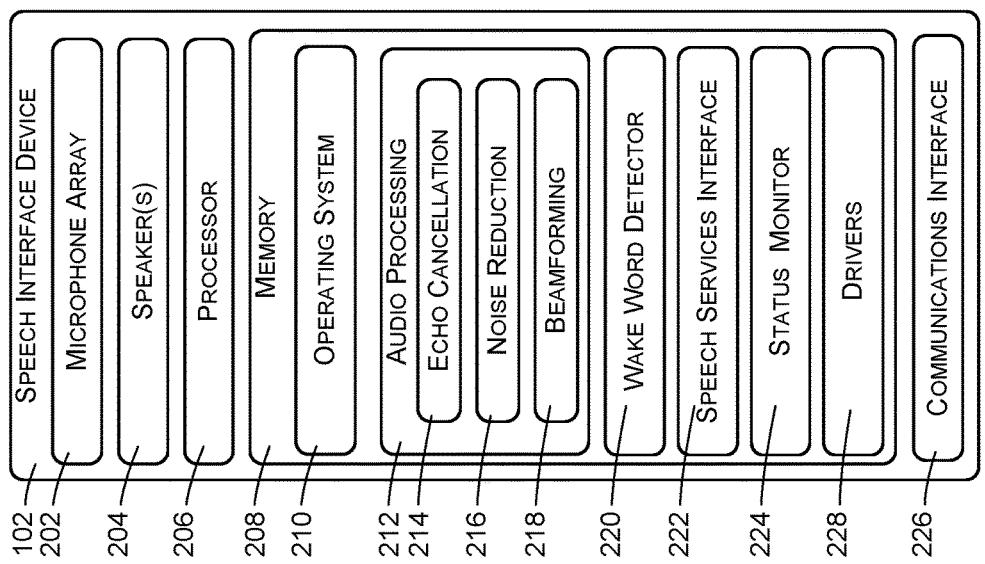

REPORTING OPERATIONAL METRICS IN SPEECH-BASED SYSTEMS

RELATED APPLICATIONS

This is a continuation application that claims priority to U.S. patent application Ser. No. 14/755,957, filed on Jun. 30, 2015, which is incorporated herein by reference in its entirety.

BACKGROUND

As the processing power available to devices and associated support services continues to increase, it has become practical to interact with users in new ways. In particular, it has become practical to interact with users through two-way speech dialogs, in which a user instructs a system by voice and the system responds by speech. However, interacting without a graphical user interface presents challenges in how to present certain types of information to users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 shows an illustrative speech-based system that includes a speech interface device and supporting network-based services.

FIG. 2 is a block diagram showing relevant functional components of the speech interface device of FIG. 1.

FIG. 3 is a block diagram showing relevant functional components of a server that may be used to implement the network-based services of FIG. 1.

DETAILED DESCRIPTION

Figure 4:
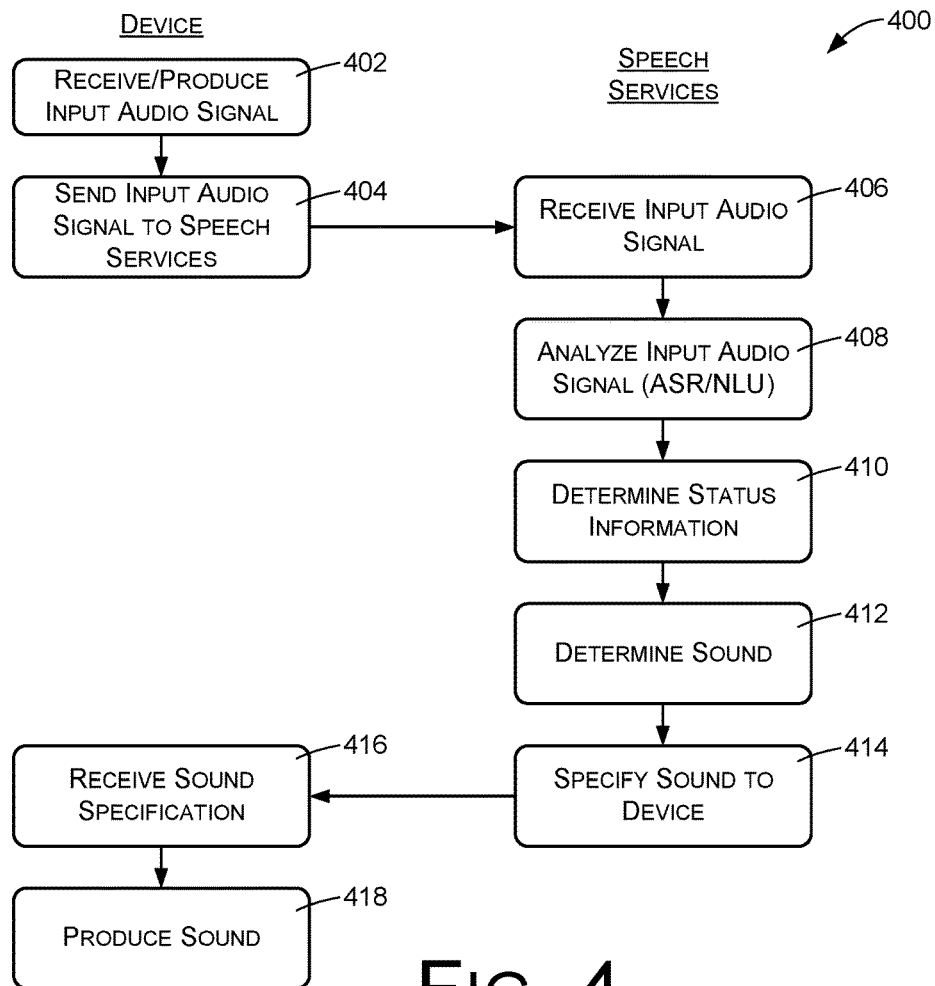
FIG. 4 a flow diagram illustrating an example method of reporting device metrics in response to a spoken query from a user.

A speech-based system may be configured to interact with a user through speech to receive instructions from the user and to provide services for the user. In certain embodiments, the system may comprise a speech interface device having a microphone and speaker for receiving user speech and playing responsive system speech. Certain functions and capabilities of the device may be implemented at least in part by network-based services, which the device may access through a data communications network such as the Internet. In particular, the network-based services may provide speech processing and interaction capabilities, including automatic speech recognition (ASR), natural language understanding (NLU), dialog management, and text-to-speech (TTS) functionality. The network-based services may also provide status reporting regarding statuses of both the speech interface device and the network-based services.

In operation, the network-based services perform ASR and NLU to determine and act upon requests by users. The system is configured to respond to user speech by performing actions, providing services, and/or producing audio. In some cases, the system may engage in a speech dialog with a user to determine the intent of the user. A speech dialog comprises two-way exchange of speech, by the user and the speech-based system, respectively.

The speech interface device is configured to report various types of statuses in response to spoken user queries and/or in response to status conditions that threaten the quality of services provided by the system.

As an example, the speech interface device may monitor the quality or strength of the wireless communications channel used by a Wi-Fi interface of the speech interface device. The wireless communications channel is subject to interference by objects and devices such walls, electronic components, furniture, sources of electromagnetic interference, etc.

In certain situations, the speech interface device may communicate information regarding the quality of the wireless communication channel with the user through generated speech or other types of sounds. For example, the speech interface device may play the speech "Wireless signal strength has dropped to an undesirable level." Furthermore, the speech interface device may use its voice capabilities to guide the user through a sequence of steps to increase the quality of the wireless communication channel. For example, the device may ask the user to move the speech interface device to a location that improves the quality of the wireless communication channel. As the device is moved, it may play a tone or other sound that changes to indicate that a measured parameter such as signal strength is increasing or decreasing.

In some embodiments, the speech interface device may indicate status information in response to a spoken user query. For example, the user may ask "How is your Wi-Fi signal?", and the speech interface device may respond with the statement "Wireless signal strength is currently 8 out of 10."

More generally, the audio capabilities of the speech interface device may be used to provide various types of device and system status information to the user, either in response to detected events or in response to spoken user requests. For example, the speech interface device may report statuses such as battery levels, communication parameters, accessories, device configuration, and so forth.

In certain embodiments, the speech interface device may be configured to provide an audio signal representing a spoken user request to supporting network-based services for ASR and NLU. The network-based services may analyze the audio signal to determine the meaning of the spoken user request. In response to determining that the user request is for a status of the speech interface device, the network-based services may communicate with the speech interface device to obtain parameters corresponding to the requested status or from which the requested status can be determined. The network-based services may then formulate a spoken response indicating the requested status and provide an audio signal to the speech interface device, wherein the audio signal represents speech that describes or otherwise states the requested status. The speech interface device then produces the speech on its loudspeaker.

In some cases, rather than communicating with the speech interface device to obtain status parameters for reporting, the network-based services may provide speech describing a partial answer to the user query or a phrase from which the actual requested value has been left out, and may request the speech interface device to provide an actual parameter value. For example, the speech provided by the network-based service may comprise "The signal strength is", and the speech interface device may then insert or append the word "eight", corresponding to the parameter.

In some embodiments, the speech interface device may periodically send updated status information to the network-based services. In response to a user request for status information, the network-based services may provide speech or other sound that indicates the most recently received status information. In addition, the network-based services may cache and monitor the status information to detect changes or out-of-limits conditions of the status information, and may audibly report the status information to the user.

Various types of sound, in addition to speech, may be used to indicate device status. For example, distinctive sounds associated with certain statuses, referred to as earcons, may be used to indicate the statuses. As another example, various types of tones, tone patterns, tone sequences, and so forth may be used to indicate statuses. As a specific example, a sound may be configured to increase in loudness or frequency as a function of a parameter value. Similarly, different tone patterns or tunes may be used to indicate parameter values.

FIG. 1 shows an example speech-based system 100 having a speech interface device 102 or other audio device that communicates with one or more supporting network-based or Internet-based services 104. The system 100 may be implemented within an environment such as a room or an office, and a user 106 is shown as interacting with the system 100. In the example shown, the user 106 speaks the query "How's your signal strength?" or a similar phrase. In response, the speech interface device 102 determines its current signal strength and produces the speech "Signal strength is 8 out of 10."

The speech interface device 102 has one or more microphones that are used to capture user speech as well as one or more speakers that are used to play speech and content. In some embodiments, the speech interface device 102 may be designed to operate from a fixed location. In other embodiments, the speech interface device 102 may be portable. For example, the speech interface device 102 may comprise a handheld device.

The speech interface device 102 has a network interface such as a Wi-Fi communications interface or other communications interface that provides data communications with the network-based services 104. The speech interface device 102 may communicate wirelessly with the network-based services through a Wi-Fi access point 108. A communication channel between the speech interface device 102 and the network-based services 104 may include a wireless, RF (radio frequency) communication channel 110, which may utilize a wireless communication standard and protocol such as Wi-Fi, which is defined by a specification known as the IEEE 802.11 specification. The Wi-Fi access point 108 may communicate with the network-based services 104 over a wide-area data communications network such as the Internet using any of various types of networking technologies, including both wired and wireless technologies.

The wireless communication channel 110 may alternatively be implemented using different wireless standards and protocols. Bluetooth is an example of a different wireless protocol that may be used to implement the wireless communication channel 110. As another example, the speech interface device may communicate with the network-based services 104 using cellular data communications.

Although not shown in FIG. 1, the physical environment of the speech interface device 102 may include various types of features that may obstruct or interfere with the wireless communication channel, including walls, furniture, other devices, various sources of electromagnetic radiation such as microwave ovens, and so forth. The quality or performance of the wireless communication channel may therefore be dependent upon the location at which the speech interface device 102 is placed within the environment.

The network-based services 104 may be part of one or more network-accessible computing platforms that are maintained and accessible via the Internet, such as are sometimes referred to as "cloud" services. Generally, communications between the speech interface device 102 and the network-based services 104 may be implemented through a combination of various types of data communications networks, including local-area networks, wide-area networks, and/or the public Internet, which may include various types of wireless networks including Wi-Fi networks, Bluetooth networks, and cellular communication networks. The network-based services 104 may serve large numbers of speech interface devices, which may be located in the premises of many different users.

In operation, the speech interface device 102 monitors a microphone audio signal or other audio signal representing sound from the environment of the speech interface device 102 to detect a user utterance of a wakeword, which is referred to more generally as a trigger expression. The trigger expression may comprise a word, a phrase, or a sound. Utterance of the trigger expression indicates that subsequent speech is directed to the speech interface device 102 and is intended to be understood and acted upon by the speech interface device 102. Upon detecting the trigger expression, the speech interface device 102 causes subsequent user speech to be analyzed to determine the meaning and intent of the speech. In some cases, the speech interface device 102 may conduct a speech dialog with the user 106 in order to determine and act upon an intent that is being expressed by the user. A speech dialog comprises multiple dialog turns, each of which may comprise one or more of a user utterance and a system-generated speech reply.

In the described embodiments, the network-based services include speech services that receive audio from the speech interface device 102 and that perform automatic speech recognition (ASR) and natural language understanding (NLU) in order to determine actions to perform in response to spoken user commands. The network-based speech services may include speech dialog functionality, which allows the system 100 to interact with a user through two way speech dialogs in which the system 100 may ask the user for additional information in order to fully define or determine the action that the user is requesting.

The network-based services 104 may also include other types of services that may be accessed and used by the speech interface device 102. For example, the network-based services 104 may provide services for email and messaging, for retail purchasing, for providing various types of information such as news, weather, and traffic information, for providing music and other audible content, for calendaring, and any number of other services. The speech interface device 102 may be configured to access these services in response to spoken requests by the user 106 and in some cases to perform actions using the services in response to user requests. For example, using the speech interface device 102 the user 106 may compose mail and other messages to be sent using an email or Internet-based messaging service; instruct the speech interface device to read received email from an email service; purchase items from an Internet-based merchant; request and receive weather, news, and traffic reports from corresponding network-based services; initiate playback of music from music services or repositories; create to-do lists or shopping lists; set timers or alarms; create appointments using a calendaring service; and so forth.

In addition to being able to ask the speech interface device 102 for services, the user 106 may speak commands or requests regarding system and device status. For example, as illustrated in FIG. 1, the user 106 may ask for the current Wi-Fi signal strength of the speech interface device 102. Similarly, the speech interface device 102 may respond to requests for information such as Bluetooth signal strength; network configuration information such as internal and external IP addresses, MAC addresses, and Wi-Fi access point names; network performance information such as communication channel bandwidths, communication speeds and latencies, numbers of packets sent and received; software information such as firmware build numbers and operating system versions; device serial numbers; battery levels; remaining battery life; device roles, such as whether a device is acting as a left or right speaker in a stereo music system or the device role in relation to home automation components; device metadata; information regarding supporting network-based services 104 such as service/server names and IP addresses, status of supporting services, etc.; information relating to connected or controlled home automation devices; and so forth.

In addition to providing device status in response to spoken user requests, the speech interface device 102 may at times provide status information in response to detecting certain events, conditions, or status changes. For example, the speech interface device 102 may monitor its Wi-Fi signal strength to detect a decrease in the Wi-Fi signal strength. In response to detecting the decrease in the Wi-Fi signal strength, the speech interface device 102 may generate speech informing the user 106 of the decrease in signal strength and describe the negative impact that this may have on the performance of the speech interface device 102. In some cases, the speech interface device 102 may instruct the user 106 regarding steps that may be taken to increase the signal strength, such as moving the speech interface device 102 to a position nearer a Wi-Fi access point 108, removing nearby objects that may be obstructing the Wi-Fi signal, changing access points, etc.

Specified device status parameters may also be indicated to the user at times such as device startup, at periodic intervals, in response to commands initiated by technicians and communicated from the network-based services, and so forth. In some cases the user 106 may instruct the system 100 to enter a monitoring mode in which parameters are audibly reported as they change.

In addition to current device status, the system 100 may be configured to audibly indicate past statuses. For example, the system 100 may be responsive to a user command or other instructions to audibly indicate a history of communications bandwidths. More generally, the system 100 may be responsive to a user command or other instructions to audibly indicate a history of device events, device errors, or status parameters that were outside of normal ranges.

FIG. 2 shows relevant components of the speech interface device 102 in an example embodiment. The speech interface device 102 has a microphone array 202 and one or more audio loudspeakers 204 that facilitate audio interactions with the user 106 and/or other users. The microphone array 202 produces microphone audio signals representing audio from the environment of the speech interface device 102 such as sounds uttered by the user 106. The microphone audio signals produced by the microphone array 202 may comprise directional audio signals or may be used to produce directional audio signals, where each of the directional audio signals emphasizes audio from a different radial direction relative to the microphone array 202.

The speech interface device 102 may comprise a processing unit 206 and associated memory 208. The processing unit 206 may comprise one or more processors, which may include general-purpose processors, specialized processors, processing cores, digital signal processors, etc. Depending on the configuration of the speech interface device 102, the memory 208 may be a type of non-transitory computer storage media and may include volatile and nonvolatile memory. The memory 208 may include, but is not limited to, RAM, ROM, EEPROM, flash memory, or other memory technology. The memory 208 may include removable or detachable memory and may also include network-accessible memory. The memory 208 may include portable storage media such as a flash memory drive.

The memory 208 may be used to store any number of software components that are executable by the processing unit 206. Software components stored in the memory 208 may include an operating system 210 that is configured to manage hardware and services within and coupled to the speech interface device 102. In addition, executable components stored by the memory 208 may include audio processing components 212 configured to produce an input audio signal using the microphone array 202. The audio processing component 212 may include functionality for processing microphone audio signals generated by the microphone array 202 and/or output audio signals provided to the loudspeaker 204. As an example, the audio processing components 212 may include an acoustic echo cancellation or suppression component 214 for reducing acoustic echo generated by acoustic coupling between the microphone array 202 and the loudspeaker 204. The audio processing components 212 may also include a noise reduction component 216 for reducing noise in received audio signals, such as elements of microphone audio signals other than user speech.

The audio processing components 212 may include one or more audio beamformers or beamforming components 218 configured to generate directional audio signals that are focused in different directions. More specifically, the beamforming components 218 may be responsive to audio signals from spatially separated microphone elements of the microphone array 202 to produce directional audio signals that emphasize sounds originating from different areas of the environment of the speech interface device 102 or from different directions relative to the speech interface device 102.

Executable components stored in the memory 208 and executed by the processor 206 may include a wake word detection component 220 that monitors one or more of the directional audio signals to detect user utterances of the system of the trigger expression. In some embodiments, the wake word detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal. For example, a keyword spotter may use a Hidden Markov Model (HMM) recognizer that performs acoustic modeling of an audio signal and compares an HMM model of the audio signal to one or more reference HMM models that have been created by training for a specific wake word.

Executable software components stored in the memory and executed by the processor 206 may also include a speech services interface 222. The speech services interface 222 is responsible for communicating with speech services that are part of the network-based services 104. For example, the speech services interface 222 may provide an audio stream to network-based speech services and may receive responsive audio from the network-based speech services. The speech services interface 222 may also communicate with the speech services in order to exchange various types of control and status information.

The speech interface device 102 may also implement a status monitor 224. The status monitor 224 monitors and reports various information regarding the speech interface device 102 and/or any supporting network-based services 104. For example, the status monitor 224 may monitor the quality of the communications channel between the speech interface device 102 and the network-based services 104. In some cases, the status monitor 224 may monitor the strength of the RF signal between the speech interface device 102 and the Wi-Fi access point 108. The status monitor 224 may also monitor other status information such as battery level, remaining battery life, communication parameters, status of accessories, software/firmware versions and build numbers, role configuration in a multi-speaker system, communication latencies, etc.

The status monitor 224 may expose an API (application programming interface) through which the speech services interface 222 or other software components of the speech interface device can request and receive status information regarding hardware and software components of the speech interface device 102.

In certain implementations, the status monitor 224 may cause the speech interface device 102 to produce output speech indicating the status information. For example, in response to determining that the RF signal quality or strength has decreased and/or is below a quality/strength threshold, the status monitor 224 may cause the speech interface device 102 to produce output speech indicating that the quality or strength of the RF signal is low and may in some embodiments instruct the user 106 how to increase the signal quality or strength.

The speech interface device 102 may have a communications interface 226 such as a wireless or Wi-Fi network communications interface, an Ethernet communications interface, a cellular network communications interface, a Bluetooth communications interface, etc., for communications with the network-based services 104 over various types of networks, including wide-area network, local-area networks, private networks, public networks etc. In the case of a wireless communications interfaces, such interfaces may include radio transceivers and associated control circuits and logic for implementing appropriate communication protocols.

The speech interface device 102 also has various hardware components, not shown, such as communication components, power components, I/O components, signal processing components indicators, control buttons, amplifiers, etc.

Software components stored in the memory 208 may include drivers 228 associated with hardware components such as the communications interface 226. The drivers 228 may include communication drivers such as Bluetooth and Wi-Fi communication stacks. Software drivers may also include power and battery management interfaces associated with power and battery components of the speech interface device 102. The status monitor 224 may communicate with the software drivers 228 to obtain status information regarding hardware aspects and other aspects of the speech interface device 102.

Generally, the status monitor 224 may have access to various types of status information relating to both hardware and software components of the speech interface device 102 and to any services that are used to support the operation of the speech interface device 102. The status monitor 224, for example, may cause the speech interface device 102 to produce output speech or other audible indicators relating to information such the following:

a setting of the audio device;
    a performance indicator of the audio device;
    a network setting;
    a wireless signal strength;
    network status information;
    a network performance indicator;
    battery information;
    status of communications by the audio device with a peripheral device;
    status of communications with the network-based service;
    status of the network-based service;
    firmware or software version information;
    diagnostic information;
    etc.

FIG. 3 illustrates examples of relevant logical or functional components of a server 300 that may be used to implement the network-based services 104, and in particular to implement network-based speech services that support the operation of the speech interface device 102. Generally, network-based speech services may be implemented by one or more servers 300, with various functionality duplicated or distributed in various ways across the different servers. Servers may be located together or separately, and organized as virtual servers, server banks, and/or server farms. The functionality described herein may be provided by the servers of a single entity or enterprise, or may utilize the servers and/or services of multiple entities or enterprises. Furthermore, the described speech services may be part of a larger infrastructure that provides various types of functions and services to multiple users, not limited to the functions and services described herein.

In a very basic configuration, the example server 300 may comprise a processing unit 302 and associated memory 304. The processing unit 302 may comprise one or more processors, which may include general-purpose processors, specialized processors, processing cores, digital signal processors, etc. Depending on the configuration of the server 300, the memory 304 may be a type of non-transitory computer storage media and may include volatile and nonvolatile memory. The memory 304 may include, but is not limited to, RAM, ROM, EEPROM, flash memory, or other memory technology. The memory 304 may include removable or detachable memory and may also include network-accessible memory. The memory 304 may include portable storage media such as a flash memory drive.

The memory 304 may be used to store any number of software components that are executable by the processing unit 302. Software components stored in the memory 304 may include an operating system 306 that is configured to manage hardware and services within and coupled to the server 300. In addition, executable software components stored by the memory 304 may include speech services 308 that support the speech-based operations of the speech interface device 102. The server 300 may also have a communications interface 310, such as an Ethernet communications adapter, for communicating with other servers 300, other networked components, and with multiple speech interface devices 102, which may be located in the homes or other premises of many different users.

The speech interface device 102 is configured with the support of the speech services 308 to receive and respond to spoken requests by the user 106. The components of the speech services 308 receive one or more audio signals that have been processed by the audio processing components 212 and perform various types of processing in order to understand the intent or meaning expressed by user speech. Generally, the speech services 308 are configured to (a) receive a signal representing user speech, (b) analyze the signal to recognize the user speech, (c) analyze the user speech to determine a meaning of the user speech, and (d) generate output speech that is responsive to the meaning of the user speech. As an example, the meaning of the user speech may correspond to a request for a report of a signal strength of the RF signal between the Wi-Fi communications interface of the speech interface device 102 and the Wi-Fi access point 108, and the output speech may be generated to indicate the signal strength of the RF signal.

The speech services 308 may include an automatic speech recognition (ASR) component 312 that recognizes human speech in the received audio signal. The ASR component 312 creates a transcript of words represented in the directional audio signals. The speech services 308 may also include a natural language understanding (NLU) component 314 that is configured to determine user intent based on recognized speech of the user 106. The NLU component 314 analyzes a word stream provided by the ASR component 312 and produces a representation of a meaning of the word stream. For example, the NLU component 314 may use a parser and associated grammar rules to analyze a sentence and to produce a representation of a meaning of the sentence in a formally defined language that conveys concepts in a way that is easily processed by a computer. The meaning may be semantically represented as a hierarchical set or frame of slots and slot values, where each slot corresponds to a semantically defined concept. NLU may also use statistical models and patterns generated from training data to leverage statistical dependencies between words in typical speech.

The speech services 308 may be implemented in part by a text-to-speech or speech generation component 316 that converts text to audio for generation at the loudspeaker 204.

The speech processing components may also include a dialog management component 318 that is responsible for conducting speech dialogs with the user 106 in response to meanings of user speech determined by the NLU component 314.

The speech interface device 102 may have domain logic 320 that is used by the NLU component 314 and the dialog management component 318 to analyze the meaning of user speech and to determine how to respond to the user speech. The domain logic 320 may define rules and behaviors relating to different information or topic domains, such as news, traffic, weather, to-do lists, shopping lists, music, home automation, retail services, and so forth. The domain logic 320 maps spoken user statements to respective domains and is responsible for determining dialog responses and/or actions to perform in response to user utterances. Suppose, for example, that the user requests "Play music." In such an example, the domain logic 320 may identify the request as belonging to the music domain and may specify that the speech interface device 102 respond with the responsive speech "Play music by which artist?"

In addition to other domains, the domain logic 320 may define a status reporting domain 322 that specifies how to handle spoken requests regarding various types of status of the speech interface device and supporting services. For example, the status reporting domain 322 may include logic and/or rules for responding to questions such as "What is the current signal strength?", "What is your IP address?", "What is the status of my email service?", etc.

In some embodiments, the speech services 308 may maintain a device status cache 324 in the memory 304, wherein the device status cache 324 maintains and repeatedly updates current status of the speech interface device 102. For example, the speech interface device 102 may communicate periodically with the speech services 308 and may enumerate multiple status parameters and state values for storage in the device status cache. Upon receiving a request for device status, the speech services 308 may access the device status cache 324 to obtain the requested status for reporting to the user.

In certain embodiments, the primary mode of user interaction with the speech interface device 102 may be through speech. For example, the speech interface device 102 may receive spoken commands from the user 106 and provide services in response to the commands. The user 106 may speak a predefined trigger expression (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the speech interface device 102, initiating Internet-based services on behalf of the user 106, and so forth.

Furthermore, the speech interface device 102 may lack typical types of graphical user interface elements. For example, the speech interface device 102 may have only limited visual elements, such as a small number of discrete indicators used to indicate basic states of the device such whether the device is on. The speech interface device 102 may lack any sort of indicator or display for displaying status information such as communication parameters or signal strengths.

In operation, the speech interface device 102 detects an utterance of the trigger expression, and in response begins streaming an audio signal containing subsequent user speech to the network-based speech services 308. The speech services 308 may perform ASR, NLU, dialog management, and speech generation as described above. Upon identifying an intent of the user and/or an action that the user is requesting, the network-based speech services 308 direct the speech interface device 102 to perform an action and/or may perform an action using other network-based services 104. For example, the network-based speech services 308 may determine that the user 106 is requesting a taxi, and may communicate with an appropriate network-based service 104 to summon a taxi to the location of the speech interface device 102. As another example, the network-based speech services 308 may determine that the user 106 is requesting status information, and may generate speech for playback by the speech interface device 102 indicating the requested status information.

The techniques described herein may be implemented in conjunction with various different types of devices, such as telecommunications devices and components, hands-free communication devices, entertainment devices, media playback devices, and other devices.

FIG. 4 illustrates an example method 400 that may be performed by the speech-based system 100. In the described example, actions of the method are performed by the speech interface device 102 and the speech services 308. Actions performed by the speech interface device 102 are shown on the left side of FIG. 4. Actions performed by the speech services 308 are shown on the right side of FIG. 4. The speech interface device 102 and the speech services 308 communicate over a data communications network such as described above.

An action 402, performed by the speech interface device 102, comprises receiving or producing an input audio signal using one or more microphones of the speech interface device 102 and the audio processing components 212. The input audio signal represents user speech, such as user speech following a user utterance of a trigger expression.

An action 404 comprises sending the input audio signal to the network-based speech services 308 for automatic speech recognition (ASR) and natural language understanding (NLU) in order to determine that the user speech comprises a request for a status, such as a status of data communications with the network-based service 104. The action 404 may be performed by the speech services interface 222 and the network communications interface 226 of the speech interface device 102. An action 406, performed by the speech services 308, comprises receiving the input audio signal using the communications interface 310 of the server 300.

An action 408 comprises analyzing the input audio signal to determine the meaning and/or intent of the user speech. This may include ASR, in which the received audio signal is analyzed to recognize the words contained in the user speech. The action 408 may also include NLU, in which the words of the speech are analyzed to determine their meaning or intent. In the embodiments described herein, the action 408 may comprise determining that the meaning of the user speech corresponds to a request for status information, such as a request for a quality metric regarding performance of the wireless communication channel between the speech interface device 102 and the network-based services 104. As an example, the user speech may correspond to a request for the signal strength of the Wi-Fi connection being used by the speech interface device 102. Similarly, the requested quality metric may relate to communication speeds, communication latencies, data loss rates, etc. Furthermore, the requested status information may relate to other operational characteristics of the system 100, such as device and network settings, other performance indicators, device and network status, device and network configuration, battery information, status of peripheral devices such as Bluetooth devices that have been associated with the speech interface device, firmware or software version information, device or system diagnostic information, status of the network-based service 104, system diagnostic information, etc.

In some cases, the user request may relate to a status of the speech interface device 102 that is already known to the speech services 308. For example, the user request may relate to a status of communications between the speech interface device 102 and the server 300. This information may be available from the communications interface and/or from drivers associated with the communications interface.

In some cases, the user request may relate to a status of the speech interface device 102, which has been stored in the device status cache 324 and periodically updated in response to communications from the speech interface device 102. As described above, the speech interface device 102 may provide current status values, parameters, and other information to the speech services 308. The speech interface device 102 may provide a full set of status parameters periodically or may notify the speech services 308 in response to changes in certain status parameters.

Figure 5:
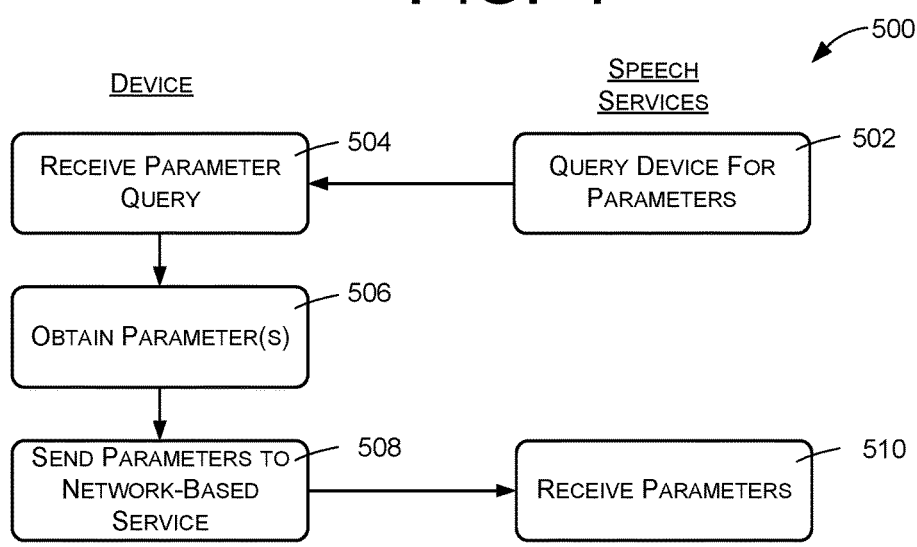
FIG. 5 is a flow diagram illustrating an example method of communicating between the speech interface device and the supporting network-based services in order to obtain status parameters.

FIG. 5 illustrates an example method 500 of performing the action 410 in situations in which the speech services 308 do not already have information sufficient to determine a user-requested status, and where the speech services 308 query the speech interface device 102 to obtain status parameters or other data relating to the current status of the speech interface device.

An action 502 comprises querying the speech interface device 102 for data, such as for one or more parameters that correspond to or are relevant to the requested status information. For example, the action 502 may comprise sending a query for a status of data communications by the speech interface device 102 with the network-based services 104. Parameters indicating the status of data communications may include signal strengths, data latencies, communication speeds, addresses, and so forth.

The action 502 may comprise a network communication from the server 300 to the speech services interface 222 of the speech interface device 102. An action 504, performed by the speech services interface 222, comprises receiving the status query from the speech services 308.

In response to receiving the query from the speech services 308, the speech interface device 102 performs an action 506 of obtaining the requested status parameters. For example, this may comprise determining status of or parameters relating to data communications with the network-based services 104.

In some cases, the action 506 may be performed by calling an API of the status monitor 224 and/or of one or more of the drivers 228. For example, the status monitor 224 may in some embodiments comprise one or more interface management APIs that are provided by the operating system 210 to provide information regarding communication interfaces of the speech interface device 102 such as Bluetooth interfaces and Wi-Fi interfaces. Such interface management APIs may provide a received signal strength indicator (RSSI) regarding each interface, indicating the signal strength of RF signals associated with the each interface. More generally, APIs may be available for providing various different types of device information, not limited to parameters relating to communications. For example, information may be available for battery levels and power management.

After obtaining the requested parameters, an action 508 comprises sending data indicating the determined status or parameters to the server 300 and to the speech services 308. An action 510, performed by the speech services 308, comprises receiving the requested status or parameters.

Returning to FIG. 4, an action 412, performed by the speech services 308, comprises determining sound to be produced by the speech interface device 102 in response to the user request. A subsequent action 414 comprises specifying the sound to the speech interface device 102.

In some cases, the actions 412 and 414 may be performed at least in part by the dialog management component 318 and the speech generation component 316. For example, the dialog management component 318 may determine an appropriate speech response that states or otherwise describes the requested status information, based on the one or more parameters received from the speech interface device 102. The speech generation component 316 may be used to generate an audio signal representing the speech response, which may be provided to the speech interface device 102.

In an action 416, the speech interface device 102 receives a sound specification from the speech services 308, where the sound specification comprises an audio signal representing speech indicating the requested status. An action 418 comprises producing the speech, such as by playing the specified sound on the loudspeaker 204 of the speech interface device.

In some embodiments, the generated output speech may instruct the user 106 regarding how to improve a reported performance parameter such as a parameter relating to wireless communications quality between the speech interface device 102 and the network-based services 104. For example, the speech services 308 may conduct a speech dialog with the user 106, in which the user is stepped through a series of troubleshooting steps. The user may be asked to move the speech interface device, as an example. As the user moves the speech interface device, the device may generate a tone having a loudness or frequency that changes in accordance with the value of the parameter that the user is trying to improve. For example, the device 102 may generate beeps at a frequency that increases as the Wi-Fi signal strength of the device 102 increases.

In different embodiments, the actions 412 and 414 may comprise specifying a sound in other ways, such as by sending a sound identifier or sending an instruction for the speech interface device 102 to play a certain sound, without actually providing an audio signal representing the sound. For example, the speech services 308 may send an instruction for the speech interface device 102 to play an earcon, and may specify an identifier that has been previously associated with the earcon. The speech interface device 102 may have data such as sound recordings corresponding to the earcon, which the speech interface device 102 may play on the loudspeaker 204 in response to receiving the instruction from the speech services 308. The speech interface device 102 may be configured to receive an instruction to play a sound, to synthesize or obtain the sound, and the produce the sound on the loudspeaker 204.

An earcon comprises any type of sound that is uniquely associated with an event or condition. An earcon may sound like a normally occurring sound such as a chime, bell, whistle, etc. Alternatively, an earcon may comprise a tone, a sequence of tones, a tune or melody, and/or any other combination of sounds that are recognizable to a user as being associated with a particular type of status or event.

The action 410 may be omitted in some implementations. In such implementations, the actions 412 and 414 may comprise generally instructing the speech interface device 102 to play a certain type or category of sound corresponding to a specified device parameter, where some characteristic of the sound is determined by the value of the device parameter. For example, the action 414 may comprise instructing the speech interface device 102 to play a tone having a loudness that corresponds to the wireless signal strength of the device 102. In response, the speech interface device 102 may determine the signal strength and play the tone with a corresponding loudness.

As another example, the action 412 may comprise determining speech that introduces or describes a parameter without actually stating the parameter, essentially leaving a "blank" space in the speech for the parameter. The speech interface device 102 may provide additional speech corresponding to the parameter. For example, the action 412 may comprise providing a speech template such as "the value of the requested parameter is _____," along with an instruction for the speech interface device to provide and insert speech indicating a numeric value of the requested parameter.

Figure 6:
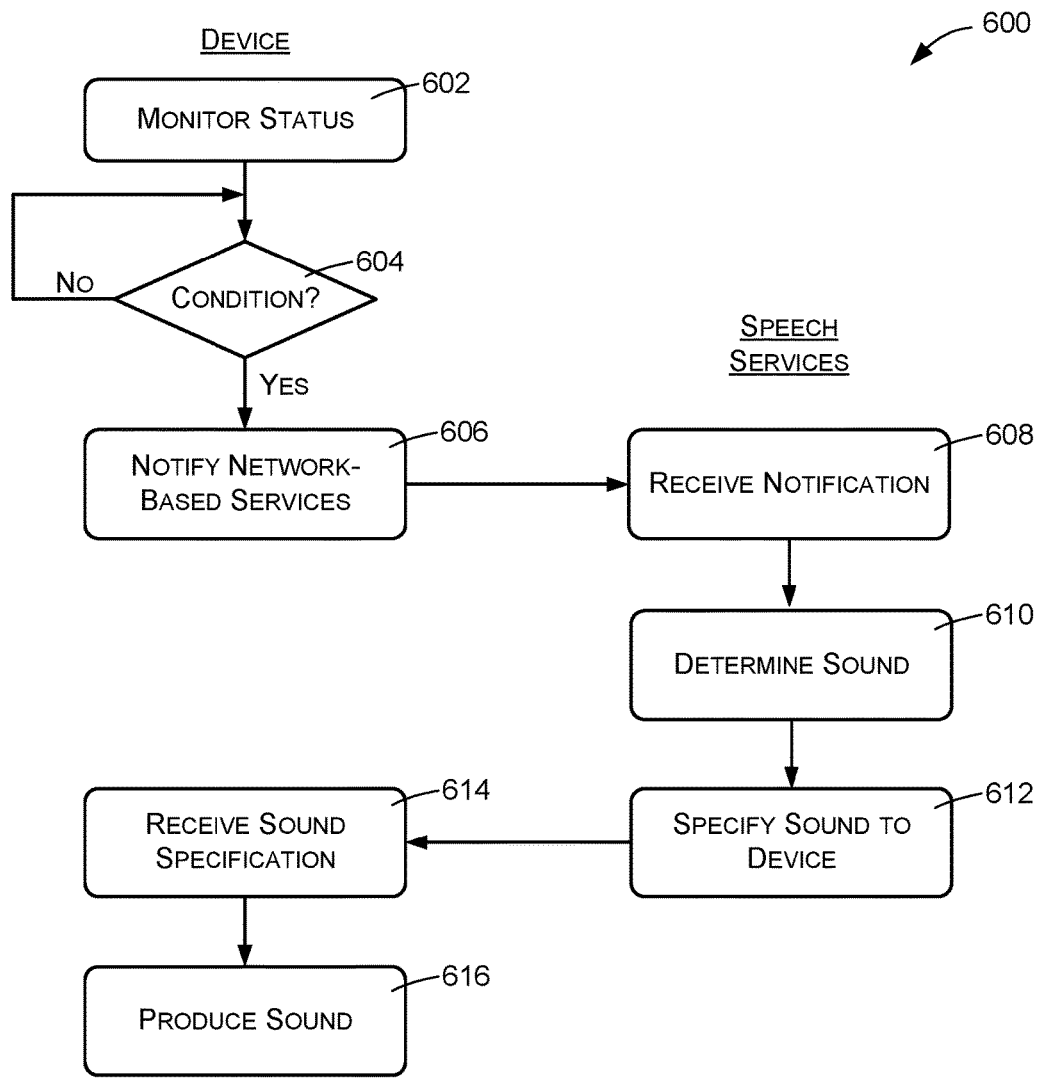
FIG. 6 is a flow diagram illustrating an example method of reporting device metrics in response to detecting conditions in which the user experience may be degraded.

FIG. 6 illustrates an example method 600 that may be performed by the speech-based system 100 to report system status in response to detected conditions or events. In this example, the system 100 monitors the status of the speech interface device 102 and generates speech or other sound to inform the user 106 regarding changing or deteriorating performance measures. Actions on the left are performed by the speech interface device 102. Actions on the right are performed by the speech services 308.

An action 602 comprises monitoring one or more status parameters over time. For example the action 602 may comprise monitoring a wireless communications parameter relating to communications between the speech interface device 102 and the Wi-Fi access point 108. As a more specific example, the action 602 may comprise monitoring the RF signal strength between the speech interface device 102 and the Wi-Fi access point 108, which may be reflected by an RSSI obtained by calling an interface management API of the speech interface device 102.

An action 604 comprises detecting a condition of the speech interface device 102, such as detecting a change in the status of the speech interface device 102. For example, the action 604 may comprise determining whether a monitored performance parameter is decreasing and/or is currently below or outside a performance threshold. If not, the action 604 continues to monitor the quality metric. If the monitored performance parameter is decreasing and/or is currently below or outside the quality threshold, an action 606 is performed of notifying the speech services 308 of the change in the status. For example, the speech services interface 222 may communicate with the speech services 308 to indicate one or more status parameters and to notify the speech services 308 that one or more of the status parameters are out-of-limit.

As a specific example, the actions 602 and 604 may comprise detecting a decrease in a performance parameter, where the performance parameter indicates a quality of communications with the network-based service 104. In some cases, such a performance parameter may comprise a signal strength or RSSI of an RF signal used by a wireless communications interface. As another example, the actions 602 and 604 may comprise detecting a nearly depleted battery level. In some cases, the action 604 may comprise comparing a performance parameter with a threshold to determine whether the performance parameter is out-of-limit.

An action 608, performed by the speech services 308, comprises receiving a notification from the speech interface device 102 regarding the changed or changing status. In response, the speech services 308 perform an action 610 of determining sound to be produced by the speech interface device 102 in response to the changed status. A subsequent action 612 comprises specifying the sound to the speech interface device 102.

The action 610 may comprise determining appropriate speech that states or otherwise describes the changed status information and/or a condition or state corresponding to the changed status information, based on the one or more parameters received from the speech interface device 102. The speech generation component 316 may be used to generate an audio signal representing the speech, which may be provided to the speech interface device 102.

In an action 612, the speech interface device 102 receives a sound specification from the speech services 308, where the sound specification comprises an audio signal representing speech indicating the requested status. An action 616 comprises producing the speech, such as by playing the specified sound on the loudspeaker 204 of the speech interface device.

In different embodiments, the actions 610 and 612 may comprise specifying a sound in other ways, such as by sending a sound identifier or sending an instruction for the speech interface device 102 to play a certain sound, without actually providing an audio signal representing the sound. For example, the speech services 308 may send an instruction for the speech interface device 102 to play an earcon, and may specify an identifier that has been previously associated with the earcon. The speech interface device 102 may have data such as sound recordings corresponding to the earcon, which the speech interface device 102 may play on the loudspeaker 204 in response to receiving the instruction from the speech services 308. The speech interface device 102 may be configured to receive an instruction to play a sound, to synthesize or obtain the sound, and the produce the sound on the loudspeaker 204.

In some embodiments, the generated output speech may instruct the user 106 regarding how to improve a reported performance parameter such as a parameter relating to wireless communications quality between the speech interface device 102 and the network-based services 104. For example, the speech services 308 may conduct a speech dialog with the user 106, in which the user is stepped through a series of troubleshooting steps. The user may be asked to move the speech interface device, as an example.

After the action 616, the method 600 repeats to continually monitor the quality metric over time. Note that the method 600 may be performed with respect to multiple types of statuses, including different performance parameters and quality metrics relating to the speech interface device 102, the network-based service 104, and other components.

In implementation, the method 600 may be implemented so that a sound corresponding to a detected status is produced by the speech interface device 102 an appropriate number of times and/or at an appropriate time interval, depending on the nature and importance of the status. For example, some types of status may be reported only a single time, even though a particular status may continue to exist over a long time period. Other types of status may be reported repeatedly, at an appropriate time interval, until the status is corrected and/or until the user acknowledges hearing the status. The frequency of status reports may vary depending on the severity of the reported condition and/or the level of interference with device operation that may result from the condition.

In some embodiments, the actions 602 and 604 may be performed by the speech services 308 or by a component of the speech services 308, instead of being performed by the speech interface device 102. In particular, in embodiments in which the speech services 308 maintain and update a device status cache 324, the action 602 may comprise monitoring parameters stored and updated in the status cache 324, in response to periodic or continuous updates of the status cache 324 by the speech interface device 102. The actions 606 and 608 may not be necessary in these embodiments.

The method 600 results in audible status notifications in response to a condition detected in the action 604. Generally, the condition may relate to things other than status values or changes. For example, the system 100 may be configured to report status information when it has been instructed to operate in a "monitoring" or "log" mode. In this mode, audible reports may be given in response to any system event, such as a communications error, a speech recognition error, a low battery event, etc. Similarly, when in a monitor mode, the speech interface device 102 may repeatedly report a particular status or parameter, so that the user can tell when the parameter increases or decreases.

Status notifications may relate to observed parameters, and may also specify more complex information such as the results of system commands. As an example, an audible system notification may comprise the results of a "traceroute" command, which is a command that identifies servers through which communications pass between the speech interface device 102 and the speech services 308.

Although the preceding describes several specific configurations in which a speech interface device might play speech indicating system status or configuration, such speech may be similarly generated in other situations to report system status and configuration. For example, the speech interface device may be responsive to an audible or inaudible tone to generate and play speech regarding one or more quality or performance metrics. As a specific use scenario, a remote technician may use this capability by generating a tone over a telephone in order to instruct the speech interface device to generate speech that enumerates a number of system parameters and metrics. Similarly, in some cases a remote technician may send instructions to the speech interface device using network communications, instructing the speech interface device to generate speech that describes different types of parameters and metrics relating to device operation.

As another use scenario, a speech interface device may be configured to report operational parameters, metrics, and quality measures upon startup of the device, or to report any such parameters, metrics, or quality measures that may result in a degradation of user experience. Such parameters, metrics, and quality measures may be reported by speech, as described above, or by different types of sounds associated with different conditions.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
   a microphone;
   a loudspeaker;
   a network communications interface configured to provide data communications with a network-based service;
   one or more audio processing components configured to produce an audio signal using the microphone, the audio signal representing user speech comprising a request for status information associated with the device;
   one or more processors; and
   one or more non-transitory computer-readable media storing instructions that, when executed by the one or more processors, cause the one or more processors to perform acts comprising:
      sending the audio signal to the network-based service via the network communications interface;

receiving, from the network-based service and via the network communications interface, an instruction to output the status information associated with the device;

determining the status information, the status information representing a measured parameter of the device;

determining, based at least in part on the status information, a value of the measured parameter of the device; and producing, using the loudspeaker, sound indicative of the value of the measured parameter.

2. The device of claim 1, wherein the sound is a first sound, and wherein the acts further comprising:

receiving, from the network-based service, audio data associated with the status information; and producing, using the loudspeaker, a second sound that is represented by the audio data, and wherein producing the first sound comprises producing the first sound indicative of the value of the measured parameter after producing the second sound.

3. The device of claim 1, wherein producing the sound indicative of the value comprises producing, using the loudspeaker, a first tone that indicates a first value of the measured parameter, and the acts further comprising:

determining that the measured parameter is increasing or decreasing;

determining a second value of the measured parameter; and producing, using the loudspeaker, a second tone that indicates the second value of the measured parameter.

4. The device of claim 1, wherein the measure parameter includes at least one of:

a wireless signal strength;
network status information;
a network setting;
battery information;
a performance indicator of the device; or
a status of a communication between the device and another device.

5. A method comprising:

generating, by an electronic device, an audio signal that represents user speech comprising a request for status information associated with the electronic device;

sending, by the electronic device, the audio signal to a network-based service;

receiving, by the electronic device, and from the network-based service, an instruction to produce sound indicating the status information associated with the electronic device, the status information representing a measured parameter of the electronic device;

determining, based at least in part on the status information, a value of the measured parameter; and producing, by the electronic device, the sound, wherein the sound indicates the value of the measured parameter.

6. The method of claim 5, wherein the sound is a first sound, and wherein the method further comprising:

receiving, from the network-based service, audio data associated with the status information; and producing a second sound that is represented by the audio data, and wherein producing the first sound comprises producing the first sound that indicates the status information after producing the second sound.

7. The method of claim 5, wherein the sound is a first sound, the method further comprising:

determining that the value of the measured parameter is increasing or decreasing;

determining additional status information based, at least in part, on the value of the measured parameter increasing or decreasing; and producing a second sound that indicates the additional status information.

8. The method of claim 5, wherein producing the sound that indicates the status information comprises producing output speech that states the status information.

9. The method of claim 5, wherein:

producing the sound comprises producing a tone that varies to indicate the value of the measured parameter.

10. The method of claim 5, further comprising:

generating an additional audio signal representing instructions for changing the value of the measured parameter; and producing an additional sound that represents the instructions.

11. The method of claim 5, wherein determining the status information comprises determining at least one of:

a setting of the electronic device;
a performance indicator of the electronic device;
a network setting;
a wireless signal strength;
network status information;
a network performance indicator;
battery information;
status of communications by the electronic device with a peripheral device;
status of communications with the network-based service;
status of the network-based service;
firmware or software version information; or
diagnostic information.

12. The method of claim 5, wherein producing the sound comprises producing a tone that indicates the value of the measured parameter.

13. A system comprising:

a network communications interface configured to provide data communications with an electronic device;

one or more processors; and one or more non-transitory computer-readable media storing instructions that, when executed by the one or more processors, cause the one or more processors to perform acts comprising:

receiving, from the electronic device via the network communication interface, data indicating status information associated with the electronic device;

determining, based at least in part on the status information, a value of a measured parameter of the electronic device, generating an audio signal representing sound that indicates the value of the measured parameter; and sending the audio signal to the electronic device via the network communication interface.

14. The system of claim 13, the acts further comprising:

receiving, from the electronic device, an initial audio signal representing user speech; and determining that the user speech includes a request for the status information associated with the electronic device.

15. The system of claim 14, the acts further comprising sending, to the electronic device, a message requesting the status information based, at least in part, on determining that the user speech includes the request.

16. The system of claim 14, the acts further comprising:
analyzing the initial audio signal using one or more speech recognition techniques,
and wherein determining that the user speech includes the request for the status information is based, at least in part, on analyzing the initial audio signal.

17. The system of claim 13, the acts further comprising:
determining, based at least in part on the status information, a change in the value of the measured parameter of the electronic device,
and wherein generating the audio signal is based, at least in part, on determining the change.

18. The system of claim 13, the acts further comprising:
receiving, from the electronic device, data indicating additional status information associated with the electronic device; and
determining that the value of the measured parameter of the electronic device increased or decreased based, at least in part, on the status information and the additional status information,
and wherein generating the audio signal is based, at least in part, on determining that the value of the measured parameter increased or decreased.

19. The system of claim 13,
wherein the sound comprises a tone that indicates the value of the measured parameter.

20. The system of claim 13, wherein generating the audio signal comprises generating an audio signal representing output speech that states the status information.

* * * * *